Patented Dec. 9, 1924.

1,518,289

UNITED STATES PATENT OFFICE.

PHILIP L. WOOSTER, OF MANHASSET, NEW YORK; LILLIAN D. WOOSTER ADMINISTRATRIX OF SAID PHILIP L. WOOSTER, DECEASED.

PROCESS OF MAKING MATERIAL FOR FILTERING AND DECOLORIZING.

No Drawing.  Application filed November 13, 1919.  Serial No. 337,854.

REISSUED

*To all whom it may concern:*

Be it known that I, PHILIP L. WOOSTER, a citizen of the United States, and resident of Manhasset, New York, have invented certain new and useful Improvements in Processes of Making Material for Filtering and Decolorizing, of which the following is a full, clear, and exact description.

A material much used for the purpose of filtering and decolorizing liquids such as sugar, glucose and other oils is animal charcoal, usually in the form commonly known as char, bone char or bone black. The value of char as a decolorizing agent is, I believe, due to the relatively large area of carbon or carbonaceous surface exposed in a porous structure. While the total area of the carbon surface thus exposed is relatively large in bone char as compared with many other decolorizing agents within the class available for commercial use, there is, nevertheless, a considerable portion of the surface of the pores of commercial char that is composed of non-carbonaceous material, and practically all of the surface is composed of a combination of carbon or carbonaceous matter with non-carbonaceous matter, partly in a state of mixture and partly in a state of chemical union.

My invention consists in so treating green bone and other similar carbonaceous material as to convert it into a suitable filtering and decolorizing agent having a materially increased carbon content over bone char as ordinarily prepared.

The usual method of preparing char consists of first removing the grease and fat from the green bone by boiling or by dissolving it by means of a suitable solvent such as benzene and then heating it away from contact with free air, preferably to redness to carbonize it. The bone is then removed from the source of heat and allowed to cool in a closed receptacle whereby free access of air is avoided and combustion of the carbon almost wholly prevented. The result is a porous structure containing a substantial proportion of carbon and carbonaceous material and characterized more particularly when reduced to a granular condition by considerable efficacy in the removal of color from liquids which come in contact with it.

While different lots of char will vary in greater or less degree in their respective carbon content and also in the proportionate amounts of other constitutents, the following tables, showing the results of analyses of two samples from different lots, are illustrative of grades of char commonly used for filtering and decolorizing sugar:

|  | 1st lot. | 2nd lot. |
|---|---|---|
|  | Per cent. | Per cent. |
| Carbon | 10.18 | 9.60 |
| Phosphates of lime and magnesia | 80.60 | 81.93 |
| Carbonate of lime | 8.43 | 7.78 |
| Sulphate of lime | 0.20 | 0.23 |
| Peroxide of iron | 0.10 | 0.12 |
| Siliceous matters | 0.29 | 0.18 |
| Common salt (chloride of sodium) | 0.20 | 0.16 |
|  | 100.00 | 100.00 |

It will be observed that in the case of these samples approximately 90% thereof in each case consists of constituents which have no appreciable effect so far as decolorizing is concerned. In fact, some of them, notably the lime, have a deleterious effect on the process as they not only tend to clog the pores of the material but have a positive retarding effect on the decolorizing action of the carbon.

My process effects among others the objects of decreasing the bone and carbonizing it and also effects the elimination of a large proportion of the lime and lime compounds and other non-carbonaceous constituents and also increases the carbon content of a given volume of bone.

When starting the manufacture of my product from green bone, I proceed to boil and then to heat the bone in the usual manner above described and place it while still hot in a closed receptacle. In addition to the bone, however, I place in the receptacle at the same time a quantity of hydrocarbon, for example, bitumen. Under these conditions I have found that the heat from the char causes an incomplete combustion of the hydrocarbon, and the gases therefrom permeate the pores of the heated char carrying with them minute particles of carbon which are deposited on the surfaces and walls of the pores thus largely increasing the carbon content. The product may at this stage be conveniently reduced to granular form by grinding or otherwise.

The next step in my process, or, if I am commencing with ordinary commercial char, the first step, comprises treating the char with a reagent having such an action on certain of the inorganic constituents as partly to volatilize them and partly to reduce them to a condition whereby they may be washed out with water or other suitable solvent or detergent.

I have discovered that hydrochloric acid is a reagent which has such an action on the inorganic constituents mentioned in the above table causing the elimination from the char of much of the lime combined with carbon and sulphate of lime and also the soluble salts.

In carrying out this step in my process I prefer to boil the char in a dilute solution of the acid or otherwise to perform the operation under the influence of heat until the reactions above mentioned have taken place whereupon the resultant product is washed free from all acid and residue and thereafter dried.

The next step in my process involves the replacement of matter removed by the last mentioned step, with carbonaceous matter from an external source. This may be accomplished by mixing the product resulting from the first step with carbonaceous material such as bitumen or other hydrocarbon or animal or vegetable oils, and heating the mixture in a retort or closed vessel. The result of the heating is that the vapors thereby created permeate the char, and the finely divided carbon particles are deposited in the minute openings of its structure thus taking the place of the constituents which were eliminated by the boiling and washing process.

The impregnating step last described can perhaps be carried out more advantageously by heating the hydrocarbon in a separate retort and allowing the vapors resulting from distillation to be conducted to or passed through the granulated char contained in a separate vessel. In either case the vapors are allowed to pass through or are drawn through the char until it is thoroughly permeated and the surfaces of the pores covered with a coating of minute particles of carbon.

In addition to the increased efficacy of bone and bone char thus treated arising out of the increased carbon content, I find that the resultant product becomes a stabilized structure and does not break down through rehandling.

It is obvious that in the practice of my invention modifications in detail may be followed and produced. I do not, therefore, wish to be limited to the details above set forth, but what I wish to secure is set forth in the following claims:

1. The process of making a filtering and decolorizing agent which consists of boiling green bone, heating it to redness, allowing it to cool in a closed receptacle in such proximity to a hydrocarbon as to effect the deposition of carbon particles in the pores of the bone, subjecting the resulting product to the action of a re-agent that will reduce a substantial part of the inorganic constituents to a condition whereby they may be dissolved or washed free from the structure, washing the residue from the structure, grinding it and subjecting it to vapor arising from the incomplete combustion of a hydrocarbon.

2. The process of making a filtering and decolorizing agent for liquids which consists in removing the fat from green bone, heating the bone, allowing it to cool in a closed receptacle in such proximity to a hydrocarbon as to effect the deposition of carbon particles in the pores of the bone, subjecting the resulting product to the action of a re-agent that will reduce a substantial part of the inorganic constituents to a condition whereby they may be dissolved or washed free from the structure, washing the residue from the structure and subjecting it to vapor arising from the incomplete combustion of a hydrocarbon.

3 In the process of making a filtering and decolorizing agent, the steps which consist in removing the fat from green bone, heating the resultant product out of contact with air and allowing it to cool in a closed receptacle in such proximity to a hydrocarbon as to effect the deposition of carbon particles in the pores of the said product.

4. The process of making a filtering and decolorizing agent which consists in removing the fat from green bone, heating it, allowing the resultant product to cool in such proximity to a hydrocarbon in such manner as to produce an incomplete combustion of said hydrocarbon, subjecting the resulting product to the action of dilute hydrochloric acid until a substantial portion of the inorganic structure has been reacted upon by the said acid, washing the residue from the structure and subjecting the resulting product to vapor arising from the incomplete combustion of a hydrocarbon.

In testimony whereof, I have signed this specification.

PHILIP L. WOOSTER.